(12) United States Patent
Takiguchi et al.

(10) Patent No.: US 6,223,614 B1
(45) Date of Patent: May 1, 2001

(54) DRIVE UNIT FOR VEHICULAR WINDOW PANE

(75) Inventors: Tsutomu Takiguchi; Keiichi Tajima, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/414,541

(22) Filed: Oct. 8, 1999

(30) Foreign Application Priority Data

Oct. 12, 1998 (JP) .................................................. 10-289536

(51) Int. Cl.[7] .............................. F16D 3/70; F16H 55/14
(52) U.S. Cl. .................................. 74/411; 74/425; 464/92
(58) Field of Search ........................ 74/425, 411, 89.22; 464/92

(56) References Cited

U.S. PATENT DOCUMENTS

| | | | |
|---|---|---|---|
| 4,748,865 | 6/1988 | Umezawa et al. | 74/411 |
| 4,899,608 | * 2/1990 | Knappe et al. | 74/425 X |
| 5,178,026 | * 1/1993 | Matsumoto | 74/425 X |
| 5,398,564 | * 3/1995 | Yoshida et al. | 74/425 |
| 5,564,981 | * 10/1996 | Iwabuchi et al. | 464/92 X |

FOREIGN PATENT DOCUMENTS 2 249 371   5/1992 (GB) .............................. F16D/3/74

* cited by examiner

*Primary Examiner*—Charles A Marmor
*Assistant Examiner*—Ankur Parekh
(74) *Attorney, Agent, or Firm*—Sughrue, Mion, Zinn, Macpeak & Seas, PLLC

(57) ABSTRACT

A drive unit, for moving up and down a vehicular window pane, including a drive motor, a worm wheel, a bracket, an elastic body, and a shaft member. The drive motor includes a motor shaft fixed to a worm. The worm wheel is rotated by the driving force of the drive motor rotatably engaged through the worm. The bracket, on which the worm wheel is mounted, includes an engaging portion, bent and raised transmitting leaves pressed by the elastic body, cutout portions, and closure portions closing the respective cutout portions. The elastic body is provided between the worm wheel and the bracket, and is rotated together with the worm. The shaft member engages with the engaging portion of the bracket.

9 Claims, 6 Drawing Sheets

PRIOR ART

DRIVE UNIT FOR VEHICULAR WINDOW PANE

BACKGROUND OF THE INVENTION

1. Field of the Invention

This invention relates to a drive unit which is provided in an apparatus for moving up and down a vehicular window pane. More particularly, this invention relates to a technique for preventing an elastic body from protruding from a bracket in an apparatus for moving up and down a vehicular window pane by transmitting the driving force of a drive motor to a shaft member via the elastic body fitted to the bracket.

2. Description of the Related Art

A drive unit for moving up and down a window pane is provided in an apparatus for moving up and down a vehicular window pane. Some drive units have a drive motor and a drive drum on which a wire is wound. Such a drive unit is adapted to move a window pane by rotating the drive drum by means of the driving force of the drive motor in order to move the wire in a predetermined direction, and in turn moving a slider to which the window pane is fitted, as the wire moves.

In the drive unit of the sort mentioned above, the driving force of the drive motor is transmitted to the drive drum via a worm wheel engaging with a worm fixed to a motor shaft, and a shaft member to be rotated integrally with the worm wheel.

FIG. 7 shows a part of the aforementioned conventional drive unit.

The drive unit comprises a worm wheel (a) engaging with a worm fixed to a motor shaft, a bracket (b) to which the worm wheel (a) is fitted, an elastic body (c) provided between the worm wheel (a) and the bracket (b), and a shaft member (not shown) fitted to the bracket (b).

The worm wheel (a) is made of plastics by monolithic molding, for example, and has an annular main wall (d), an external wall (e) projecting from the outer peripheral edge of the main wall (d), and an internal wall (f) projecting from the inner peripheral edge of the main wall (d), the space surrounded by the main wall (d), the external wall (e) and the internal wall (f) being formed as a configuration space. A gear portion is also formed on the external surface of the external wall (e) of the worm wheel (a). Further, projecting portions (g), separated from each other in the peripheral direction are formed so as to project from the internal surface of the main wall (d) into the configuration space.

The bracket (b) is a metallic plate that is pressed into shape and has bent portions. More specifically, the bracket (b) has a substantially disk-like fitting portion (h) and projected supporting leaves (i), separately formed in the peripheral direction of the peripheral edge portion of the fitting portion (h), that are integrally formed. In this case, these projected supporting leaves (i), function to transmit the rotational force of the worm wheel (a), rotated by the drive motor, to the drive drum via the shaft member.

Each of the projected supporting leaves (i), is formed by making an L-shaped slit in the peripheral edge portion of the fitting portion (h) and then bending perpendicularly the portion surrounded by the slit. The formation of the projected supporting leaves (i), through the bending process is followed by the formation of cutout portions (j), in the peripheral edge portion of the fitting portion (h), the cutout portions (j), being open in the radial direction. Further, a slit-like engaging hole (k) is formed in the central portion of the fitting portion (h).

The elastic body (c) is made of rubber material, for example, and includes three main parts (l), extending in the peripheral direction and positioned separately, and narrow coupling portions (m), each for coupling the main parts (l), these being integrally formed. Further, supporting grooves (n), opened outwardly are formed in the central portions of the respective main parts (l).

The supporting grooves (n), of the elastic body (c) are respectively supported by the projected supporting leaves (i), of the bracket (b), whereby each of the main parts (l), of the elastic body (c) are disposed between the projected supporting leaves (i). In this state, the worm wheel (a) is mounted on the bracket (b) from the opposite side of the bracket (b) with the elastic body (c) held therebetween, so that each of the projected portions (g), of the worm wheel (a) may be positioned between the main parts (l) of the elastic body (c). Further, one end portion of the shaft member is made with the engaging hole (k) of the bracket (b) so as to pass the shaft member through the central hole (o) of the worm wheel (a). Then a wire is wound on the side of the other end portion of the shaft member to fit the drive drum (not shown) thereto.

Thus, the worm wheel (a) engages with the worm, which is fixed to the motor shaft which in turn is rotated when the drive motor is rotated, and the drive drum is also rotated as the worm wheel (a) rotates.

When the worm wheel (a) is rotated, the main parts (l), of the elastic body (c) are pressed by the projected portions (g), of the worm wheel (a) to make the elastic body (c) rotate. Simultaneously, the projected supporting leaves (i), of the bracket (b) are pressed against the respective main parts of the elastic body (c), so that the bracket (b) is rotated. Then the shaft member mated with the engaging hole (k) is rotated as the bracket (b) rotates, whereby the drive drum fitted to the shaft member is also rotated.

Thus, the drive drum is rotated when the driving force of the drive motor is transmitted to the worm wheel (a), the elastic body (c), the bracket (h) and the shaft member in this order. The wire wound on the drive drum is moved in the predetermined direction and the window pane is moved up and down as the slider moves.

Incidentally, transmitting the rotational force of the drive motor to the drive drum by placing the elastic body (c) between the worm wheel (a) and the bracket (b) is aimed to prevent the worm wheel (a) and the bracket (b) from being scraped away or worn down in order to increase a noise-suppressing effect during the rotational operation by avoiding direct contact therebetween.

As stated above, the projected supporting leaves (i), of the bracket (b) are pressed against the main parts (l), of the elastic body (c) and the bracket (b) is rotated when the drive motor is rotated.

However, since the cutout portions (j), are formed in the peripheral edge portion of the fitting portion (h) of the bracket (b) by forming the projected supporting leaves (i), through the bending process, as shown in FIG. 8; there is the possibility that the main parts (l), may be bent and protrude from the cutout portions (j), when the projected supporting leaves (i), of the bracket (b) are pressed by the main parts (l), of the elastic body (c).

If the main parts (l), of the elastic body (c) thus protrude from the cutout portions (j), there occurs a non-conformity, in that the driving force of the drive motor is not properly transmitted to the drive drum.

SUMMARY OF THE INVENTION

It is therefore an object of the present invention to solve the foregoing problems and to provide an apparatus for preventing an elastic body from protruding from a bracket in a drive unit which is provided in an apparatus for moving up and down a vehicular window pane.

In order to solve the foregoing problems, an innovative drive unit, for moving up and down a vehicular window pane, which includes a drive motor, a worm wheel, a bracket, an elastic body, and a shaft member is proposed. The drive motor includes motor shaft fixed to a worm. The worm wheel is rotated by the driving force of the drive motor engaging with the worm. The bracket, on which the worm wheel is mounted, includes an engaging portion, bent and raised transmitting leaves, cutout portions, and closure portions closing the respective cutout portions. The elastic body is provided between the worm wheel and the bracket, and is rotated together with the worm. The shaft member engages with the engaging portion of the bracket.

Therefore, the elastic body is prevented from protruding from the cutout portions in the drive unit provided in the apparatus for moving up and down a vehicular window pane according to the present invention.

DETAILED DESCRIPTION OF THE PREFERRED EMBODIMENT

An embodiment of the drive unit provided in an apparatus for moving up and down a vehicular window pane according to the present invention will now be described with reference to the accompanying drawings.

Figure 1:
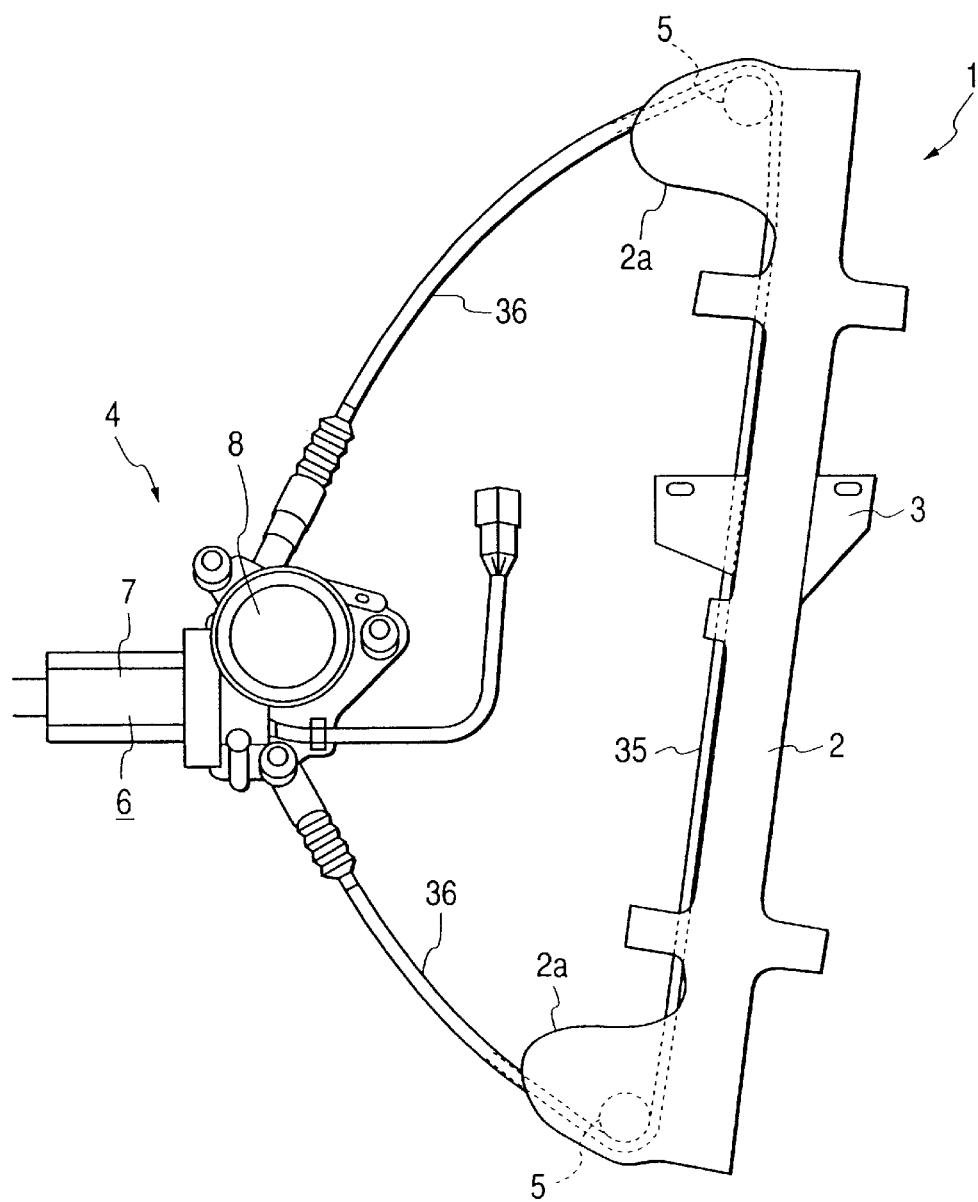
FIG 1 is a schematic side view of such an apparatus for moving up and down a vehicular window pane, and together with FIGS. 2–6 illustrate a drive unit which is provided in an apparatus for moving up and down a vehicular window pane according to resent invention.

An apparatus 1 for moving up and down a vehicular window pane comprises a guide rail 2, a slider 3 and drive unit 4 (see FIG. 1).

The guide rail 2 is in the form of a substantially C-channel (in transverse cross-section) and is substantially longer in its vertical direction (length) than its horizontal direction (width).

Both upper and lower end portions of the guide rail 2 are each provided with fitting portions 2a where pulleys 5, each having peripheral grooves, are rotatably supported. The guide rail 2 is secured to a door frame with screws or the like.

The slider 3 is movably supported on the guide rail 2 in the substantially vertical direction and one end portion of the window pane (not shown) is fitted to the slider 3.

Figure 2:
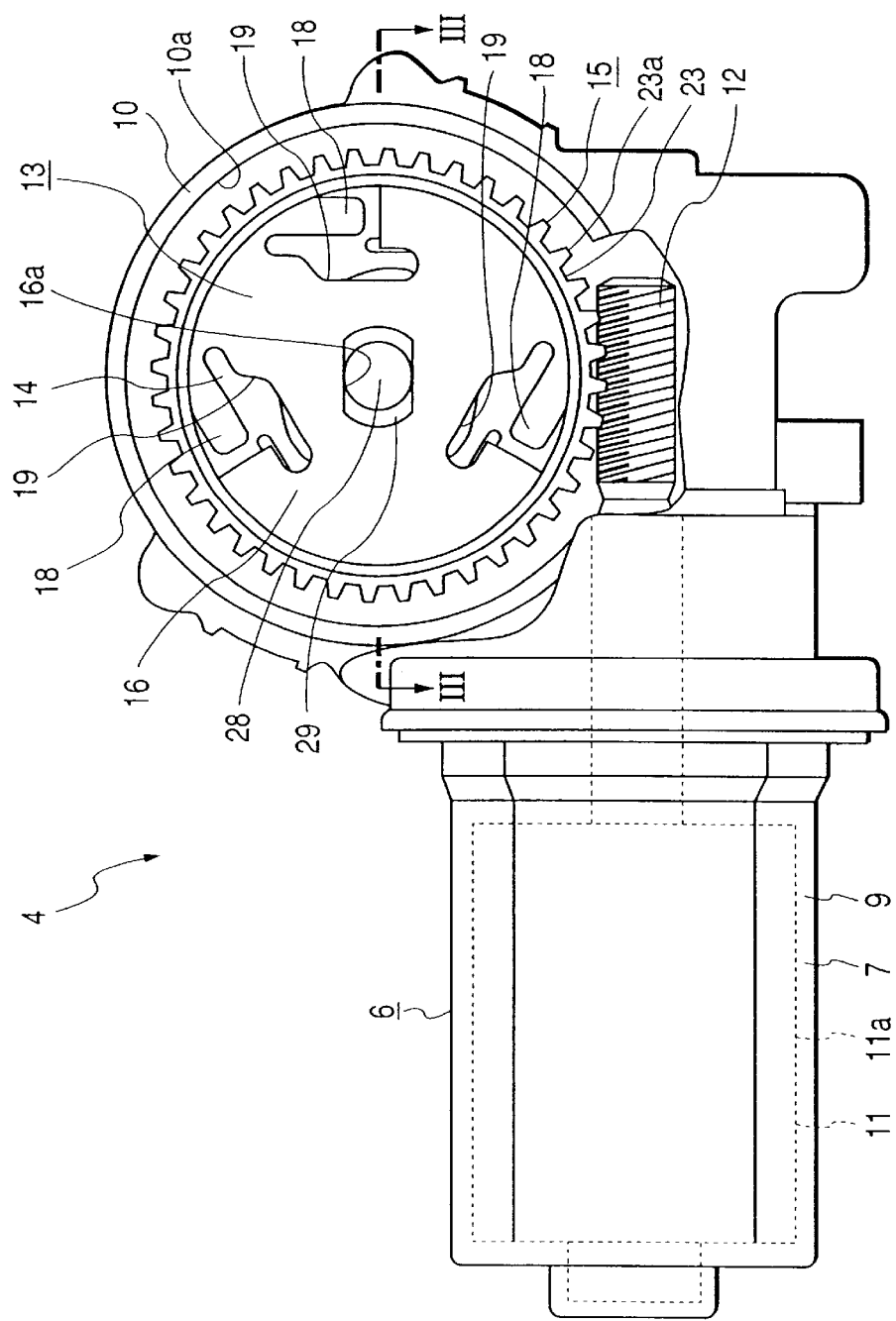
FIG. 2 is an enlarged partially cutaway side view of a drive unit.
Figure 3:
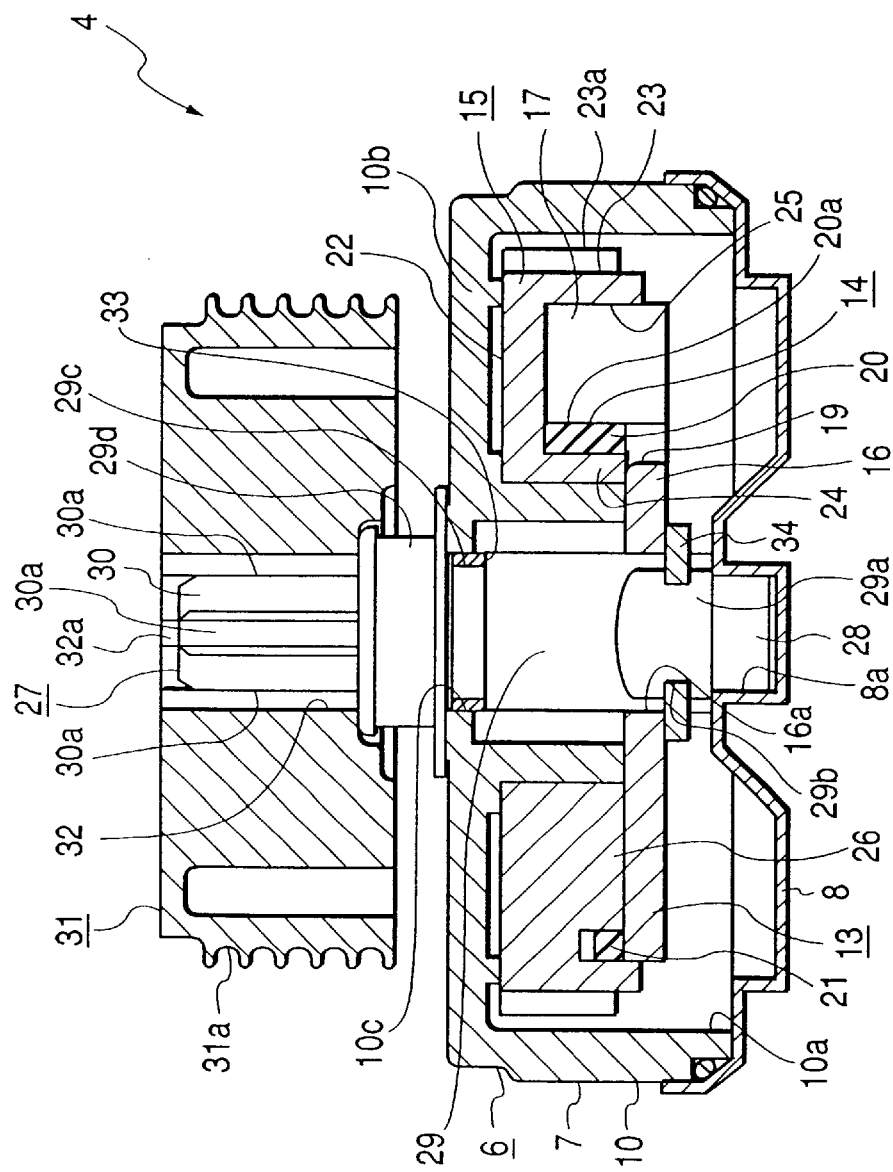
FIG. 3 is an enlarged sectional view taken on line III—III of FIG. 2.
Figure 4:
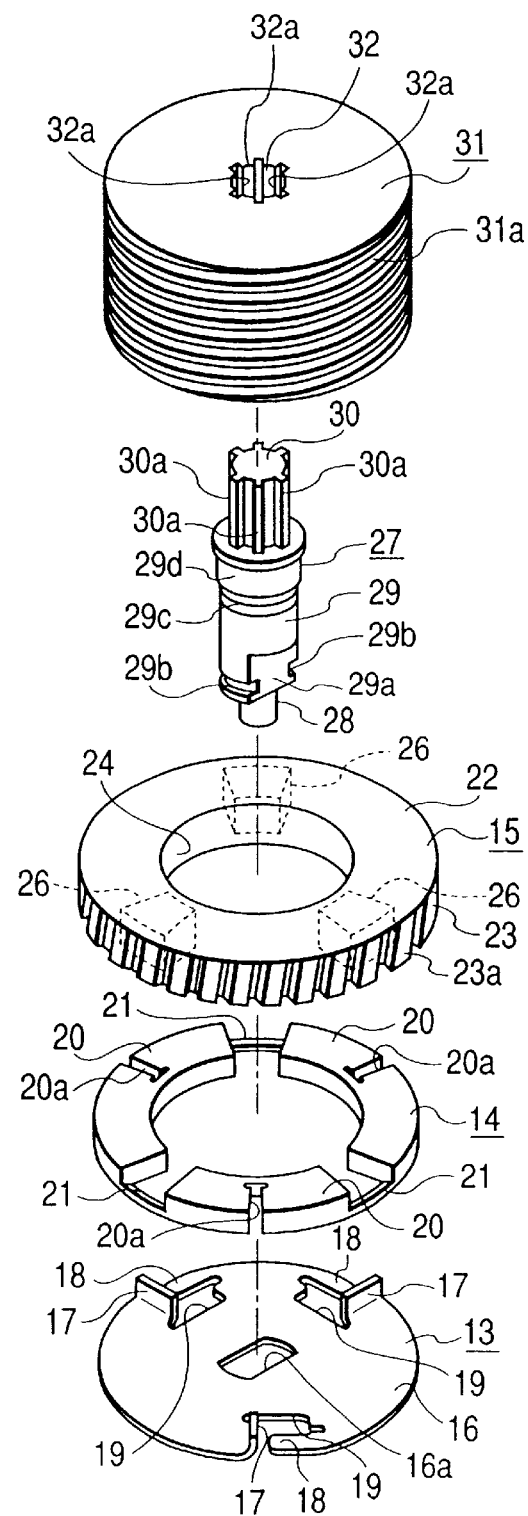
FIG. 4 is an enlarged partial exploded perspective view of the drive unit.

The drive unit 4 includes desired members that are supported by or mounted in a case body 6 (see FIGS. 2–4).

The case body 6 is formed by coupling a cover body 8 to a body portion 7 (see FIGS. 1 and 2). The body portion 7 is such that a first and a second configuration portion 9 and 10 may be integrated or integral with each other; a part of a drive motor, which will be described hereinafter, is to be disposed in the first configuration portion 9 and a worm wheel, which will be described hereinafter, and the like are to be disposed in the second configuration portion 10 (see FIG. 2). An opening 10a, that is opened to one side, is formed in the second configuration portion 10. A support hole 10c is formed in a side 10b opposite to the side which the opening 10a of the second configuration portion 10 is formed, and the opening 10a is covered with the cover body 8 (see FIG. 3).

The body 11a of the drive motor 11 is disposed in the first configuration portion 9, and a worm 12 is provided for the motor shaft of the drive motor 11 (see FIG. 2).

Each of the component members including a bracket 13, an elastic body 14, a worm wheel 15 and the like are disposed in the case body 6 (see FIGS. 2 and 3).

The bracket 13 is a metallic plate that is pressed, for example, into a desired shape having bent portions. More specifically, the bracket 13 has a substantially disk-like fitting portion 16, projected supporting leaves 17 separately formed in the peripheral direction of the peripheral edge portion of the fitting portion 16, and closure leaves 18 separately formed in the peripheral direction of the peripheral edge portion of the fitting portion 16, these component parts being integrally formed (see FIGS. 3, 4 and 6). In this case, these projected supporting leaves 17 transmit the rotational force of the worm wheel 15, rotated by the drive motor 11, to a drive drum, which will be described hereinafter.

A slit-like engaging hole 16a is formed in the central portion of the fitting portion 16 and has two portions whose opening edges separately extend in parallel to each other and two arcuate portions that are continuous to the respective extended portions (see FIGS. 2–4).

Each of the projected supporting leaves 17 is formed by making an L-shaped slit in the peripheral edge portion of the fitting portion 16 and then bending perpendicularly the portion surrounded by the slit. The formation of the projected supporting leaves 17 through the bending process is followed by the formation of cutout portions 19 in the peripheral edge portion of the fitting portion 16, the cutout portions 19 being open in the radial direction (see FIGS. 2–4 and 6).

Each of the closure leaves 18 is formed so as to be disposed in part of each of the cutout portions 19 and also extended in the substantially peripheral direction of the fitting portion 16 (see FIGS. 2–4 and 6). With respect to each of the closure leaves 18 a portion excluding a base portion 18a is formed as a closure portion 18b that is slightly wider than the base portion 18a, which is formed with a width narrower than one of the closure portions 18b (see FIG. 6).

The elastic body 14 is made of rubber material, for example, and includes three main parts 20 extending in the peripheral direction and positioned separately, and narrow coupling portions 21 each for coupling the main parts 20 these being integrally formed (see FIGS. 3 and 4). Further, each of the coupling portions 21 is positioned so as to couple the peripheral faces of the main parts 20 and 20. Moreover, supporting grooves 20a opened outwardly are formed in the central portions of the respective main parts 20 (see FIGS. 3 and 4).

The worm wheel 15 is made of plastics by monolithic molding, for example, and has an annular main wall 22, an external wall 23 projecting from the outer peripheral edge of the main wall 22, and an internal wall 24 projecting from the inner peripheral edge of the main wall 22, a space 25 surrounded by the main wall 22, the external wall 23 and the internal wall 24 being formed as a configuration space (see FIG. 4). A gear portion 23a is also formed on the external surface of the external wall 23 of the worm wheel 15. Further, projected portions 26 separated from each other in the peripheral direction are formed so as to project from the internal surface of the main wall 22 into the configuration space (see FIGS. 3 and 4).

A shaft member 27 is mated with the engaging hole 16a of the bracket 13, the shaft member 27 being formed integrally with a supporting portion 28, an intermediate portion 29 and a drum fitting portion 30 (see FIGS. 3 and 4).

The shaft member 27 is positioned with the drum fitting portion 30 opposite to the supporting portion 28, with the intermediate portion 29 therebetween (see FIG. 4). The one end portion 29a of the intermediate portion 29 is similar in cross section to the engaging hole 16a of the bracket 13 and is formed as an engaging portion (see FIG. 4). First fitting grooves 29b extending in the peripheral direction are formed in the arcuate surface of the engaging portion 29a. A second fitting groove 29c extending in the peripheral direction is formed in a portion closer to the other end of the intermediate portion 29. A portion on the other end from the second fitting groove 29c is formed as a large-diameter portion 29d having a slightly larger diameter than the rest of the intermediate portion 29 (see FIG. 4).

The supporting portion 28 is positioned on one end of the intermediate portion 29, in the form of a round rod smaller in diameter than the intermediate portion 29. Further, the drum fitting portion 30 is positioned on the other end of the intermediate portion 29 and provided with ridges 30a extending in the axial direction on its peripheral face.

A drive drum 31 is mounted in the drum fitting portion 30 of the shaft member 27. The drive drum 31 is substantially columnar, and a winding groove 31a, on which the wire is wound, is formed spirally on its peripheral face (see FIGS. 3 and 4). Further, a fitting hole 32 extending in the axial direction is formed in the central portion of the drive drum 31. Grooves 32a extending in axial direction corresponding to the ridges 30a of the shaft member 27, are formed in the fitting hole 32 (see FIG. 4). A retaining portion (not shown) for retaining the wire is formed on both axial faces of the drive drum 31.

The supporting grooves 20a of the elastic body 14 are supported by the respective projected supporting leaves 17 of the bracket 13, whereby each of the main parts 20 of the elastic body 14 is disposed between the projected supporting leaves 17. In this state, the worm wheel 15 is mounted on the bracket 13 from the opposite side of the bracket 13 with the elastic body 14 held therebetween so that each of the projected portions 26 of the worm wheel 15 may be positioned between the main parts 20 of the elastic body 14. Moreover, the elastic body 14 is disposed in the configuration space 25 of the worm wheel 15 in such a state that the worm wheel 15 has been mounted on the bracket 13 (see FIGS. 3 and 4).

In that state in which the elastic body 14 and the worm wheel 15 have been mounted on the bracket 13, these are inserted into the second configuration portion 10 through the opening 10a of the case body 6 so that the main wall 22 of the worm wheel 15 faces the surface 10b (see FIG. 3). Then the supporting portion 28 and the intermediate portion 29 excluding the large-diameter portion 29d of the shaft member 27 is inserted from the support hole 10c, and the engaging portion 29a is inserted into and mated with the engaging hole 16a of the bracket 13. At this time, an o-ring 33 is overlaid in the second fitting groove 29c of the shaft member 27, which is rotatably supported with the case body 6 in this condition (see FIG. 3).

While the engaging portion 29a of the shaft member 27 is mating with the engaging hole 16a, a stopper ring 34 is overlaid in the first fitting groove 29b and the shaft member 27 is fitted to the bracket 13 (see FIG. 3).

The cover body 8 is fitted in the second configuration portion 10 of the case body 6 so as to cover the opening 10a, and the supporting portion 28 of the shaft member 27 fitted to the bracket 13 is rotatably supported by the support hole 8a of the cover body 8.

The ridges 30a, disposed in the drum fitting portion 30 of the staff member 27, are fitted in the respective grooves 32a of the fitting holes 32 of the drive drum 31, whereby the drive drum 31 is fitted to the shaft member 27 (see FIG. 3). In this case, the drive drum 31 is prevented from slipping off the shaft member 27 by a fall-off preventive means (not shown).

The wire 35 whose intermediate portion is partially fixed to the slider 3 is wound on the pulleys 5 rotatably supported by the guide rail 2. Further, portions closer to both ends of the wire 35 are wound on the winding groove 31 a of the drive drum 31, whereas both ends of the wire 35 are retained by the retaining portions of the drive drum 31. Part of the wire 35 is covered with tubes 36 (see FIGS. 1 and 3).

When the drive motor 11 is rotated, the worm wheel 15 engaged with the worm 12 is rotated, and the drive drum 31 is also rotated as the worm wheel 15 rotates (see FIGS. 2 and 3).

More specifically, the main parts 20 of the elastic body 14 are pressed by the projected portions 26 to cause the elastic body 14 to rotate when the worm wheel 15 is rotated. Simultaneously, the bracket 13 is also rotated as the projected supporting leaves 17 of the bracket 13 are pressed against the main parts 20 of the elastic body 14. The shaft member 27 fitted to the bracket 13 is rotated as the bracket 13 rotates, and the drive drum 31 fitted to the shaft member 27 is then rotated (see FIGS. 3 and 4).

Thus, the drive drum 31 is rotated when the driving force of the drive motor is transmitted to the worm wheel 15, the elastic body 14, the bracket 13 and the shaft member 27 in this order. The wire 35 wound on the drive drum 31 is moved in the predetermined direction and the window pane is moved up and down as the slider 3 moves.

When the drive motor 11 is rotated, the main parts 20 of the elastic body 14 are pressed by the projected portions 26 and the projected supporting leaves 17 of the bracket 13 are pressed against the main parts 20 so that the bracket 13 is caused to rotate. Although the main parts 20 are easily displaceable at this time and tend to protrude from the cutout portions 19 as the main parts 20 are subjected to pressing force from the projected portions 26 the main parts 20 will never protrude from the cutout portions 19 because the closure portions 18b for partially closing the cutout portions 19 are provided for the bracket 13.

Therefore, the driving force of the drive motor 11 is properly transmitted to the drive drum 31.

A method of formed the bracket 13 will now be described (see FIGS. 5 and 6).

Figure 5:
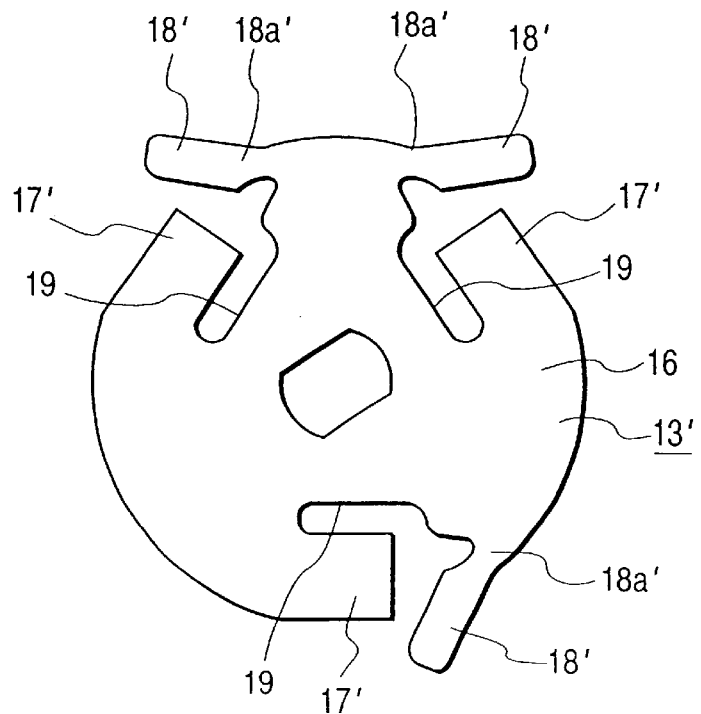
FIG. 5 is an enlarged plan view of an intermediate body.
Figure 6:
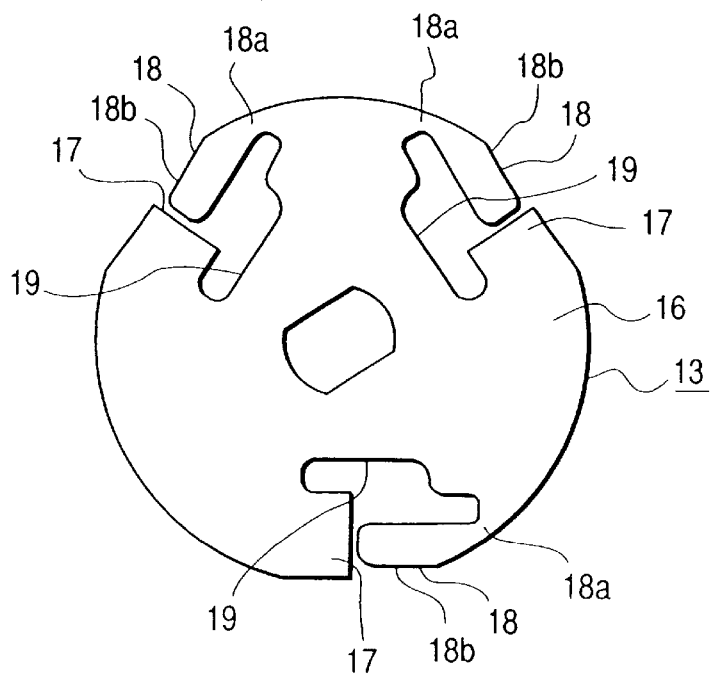
FIG. 6 is an enlarged plan view of a bracket.
Figure 7:
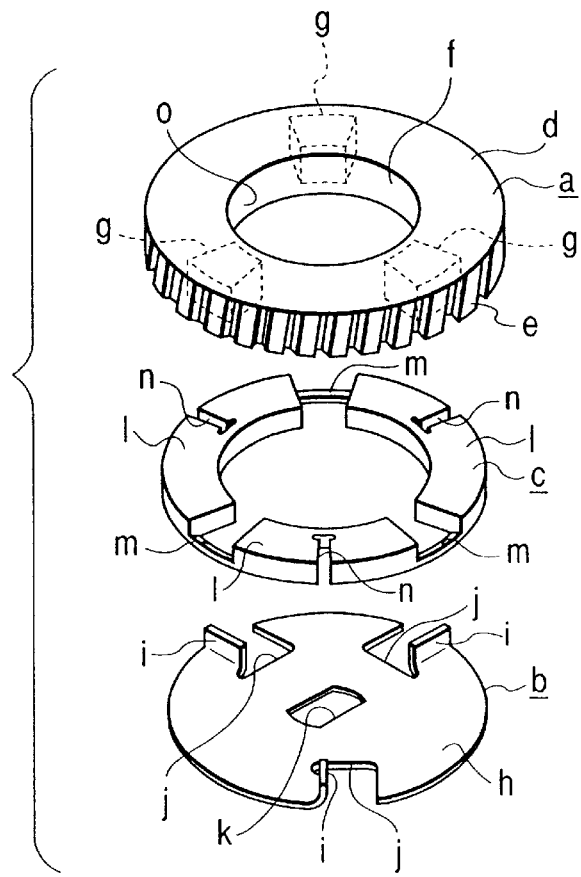
FIG. 7 is an enlarged partial exploded perspective view of a conventional drive unit.
Figure 8:
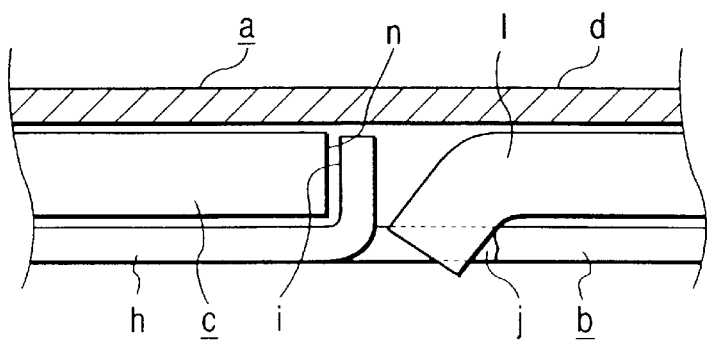
FIG. 8 is a conceptual diagram graphically illustrating the deficiencies of the conventional drive unit of FIG. 7.

Firstly, a plate-like metallic material is formed by pressing, for example, into an intermediate body 13' having a predetermined configuration of FIG. 5. The intermediate body 13' includes the fitting portion 16, first projected portions 17' continuously extending in the peripheral direction of the fitting portion 16, and second projected portions 18'—that are continuous to the fitting portion 16 and whose leading end portions are positioned outside the respective leading ends of the first projected portions 17'. The engaging hole 16*a* is formed in the central portion of the fitting portion 16 (see FIG. 4). Further, portions continuous to (between) the fitting portion 16 and the second projected portions 18' that is, base portions 18*a*' are made narrow.

Secondly, the first projected portions 17' are bent so as to be positioned at right angles respectively to the fitting portion 16, in order to form the first projected portions 17' into projected supporting leaves 17.

Thirdly, the base portions 18*a*' are bent toward the fitting portion 16 until the second projected portions 18' are positioned so as to extend in the peripheral direction of the fitting portion 16, in order to form the second projected portions 18' into closure portions 18 positioned in the respective cutout portions 19. The bracket 13 is thus formed.

As set forth above, the closure portions 18 are formed integrally with the bracket 13, whereupon the production cost is prevented from increasing as the formation of the closure portions 18 will not result in increasing the number of parts.

Since the slender base portions 18*a*' are formed, moreover, the work of bending the closure portions 18 can easily be done, which make it possible to improve workability.

The specific configurations and the structure shown in the above-described embodiment of the invention are only intended to implement the invention in an exemplary way and should not be understood to limit the technical scope of the invention.

As is obvious from the description above, a drive unit for moving up and down a vehicular window pane according to the present invention includes a drive motor, a worm wheel, a bracket, an elastic body, and a shaft member. The drive motor includes a motor shaft fixed to a worm. The worm wheel is rotated by the driving force of the drive motor engaging with the worm. The bracket, on which the worm wheel is mounted, includes an engaging portion, bent and raised transmitting leaves pressed by the elastic body, cutout portions, and closure portions closing the respective cutout portions. The elastic body is provided between the worm wheel and the bracket, and is rotated together with the worm. The shaft member engages with the engaging portion of the bracket.

Therefore, the elastic body is prevented from protruding from the cutout portions during the operation and the driving force of the drive motor is properly transmitted to the drive drum.

Moreover, the bracket of the drive unit according to the present invention is preferably formed from an intermediate body, prepared from a plate-like metallic material wherein the closure portions are provided for the intermediate body by forming projecting leaves, projecting in predetermined directions, and then bending the projecting leaves. Thus, the production cost is prevented from increasing as the formation of the closure means will not result in an increased number of parts.

Furthermore, a drive unit according to the present invention is such that each of the projected leaves is formed into the closure portions by bending the base portion of the projected leaf. The base portions of the projected leaves are made more slender than the main portions thereof, so that the work of bending the closure means can easily be done, making it possible to improve workability.

What is claimed is:

1. A drive unit for moving up and down a vehicular window pane, said drive unit comprising:
    a drive motor which produces a driving force including: motor shaft fixed to a worm;
    a worm wheel rotated by the driving force of said drive motor rotatably engaged through said worm;
    a bracket, on which said worm wheel is mounted, including:
        an engaging portion;
        bent and raised transmitting leaves;
        cutout portions, formed by forming the transmitting leaves into a bent and raised shape; and
        closure portions closing said respective cutout portions;
    a shaft member engaged with said engaging portion of said bracket; and
    an elastic body provided between said bracket and said worm wheel, engaged and rotated together with said worm wheel;
    said transmitting leaves pressed by and engaged with said elastic body in order to transmit the driving force of said drive motor to said shaft member through said bracket.

2. The drive unit according to claim 1, wherein said bracket is formed from an intermediate body formed from a metallic plate.

3. The drive unit according to claim 2, wherein said intermediate body includes projecting leaves projecting in a predetermined direction.

4. The drive unit according to claim 3, wherein said bracket is formed by bending said projecting leaves of said intermediate body.

5. The drive unit according to claim 3, wherein each of the projected leaves includes a base portion, and is formed into said closure portions by bending said base portion of said projected leaf.

6. The drive unit according to claim 5, wherein said base portions of said projected leaves are more slender than any other portions of said projecting leaf.

7. The drive unit according to claim 2, wherein said intermediate body is made of metallic material.

8. The drive unit according to claim 2, wherein said intermediate body is formed by pressworking.

9. The drive unit according to claim 1, wherein each of said closure portions includes a root portion which is more slender than any other portions of said closure portion.

\* \* \* \* \*